(12) United States Patent
Varadarajan et al.

(10) Patent No.: US 10,514,896 B2
(45) Date of Patent: *Dec. 24, 2019

(54) WEB APPLICATION BUILDER FRAMEWORK

(71) Applicant: salesforce.com, inc., San Francisco, CA (US)

(72) Inventors: Adheip Varadarajan, Daly City, CA (US); Jan Ove Kristian Olsson, Castro Valley, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,554

(22) Filed: Aug. 30, 2017

(65) Prior Publication Data
US 2019/0065157 A1 Feb. 28, 2019

(51) Int. Cl.
| | | |
|---|---|---|
| G06F 9/44 | (2018.01) | |
| G06F 8/36 | (2018.01) | |
| G06F 8/35 | (2018.01) | |
| G06F 8/34 | (2018.01) | |
| G06F 3/0482 | (2013.01) | |
| G06F 3/0486 | (2013.01) | |

(52) U.S. Cl.
CPC .................. *G06F 8/36* (2013.01); *G06F 8/34* (2013.01); *G06F 8/35* (2013.01); *G06F 3/0482* (2013.01); *G06F 3/0486* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Qamrun Nahar
(74) *Attorney, Agent, or Firm* — Weaver Austin Villeneuve & Sampson LLP

(57) ABSTRACT

Disclosed are examples of systems, apparatus, methods and computer program products for providing a web application builder framework in a database system. A database system maintains a multi-tenant database associated with a number of users and a number of web application builder components for constructing web application components based on user input. The system displays a user interface for the web application builder framework with a selectable list of web application builder components and one or more development areas for building a web application builder based on user input. Based on a user request to select one or more web application builder components, the system presents and displays the selected web application builder components as implemented within the one or more development areas.

20 Claims, 13 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 6,957,186 B1 | 10/2005 | Guheen et al. |
| 7,062,502 B1 | 6/2006 | Kesler |
| 7,069,231 B1 | 6/2006 | Cinarkaya et al. |
| 7,069,497 B1 | 6/2006 | Desai |
| 7,076,766 B2 | 7/2006 | Wirts et al. |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,078,501 B2 | 9/2018 | Narayanan et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0226111 A1* | 12/2003 | Wirts .............. G06F 8/38 715/209 |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2008/0270451 A1 | 10/2008 | Thomsen et al. |
| 2009/0043798 A1 | 2/2009 | Tan et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0047413 A1 | 2/2014 | Sheive et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2019/0065155 A1 | 2/2019 | Varadarajan et al. |
| 2019/0065158 A1 | 2/2019 | Varadarajan et al. |
| 2019/0065159 A1 | 2/2019 | Varadarajan et al. |

OTHER PUBLICATIONS

U.S. Appl. No. 15/691,557, filed Aug. 30, 2017, Varadarajan et al.
U.S. Appl. No. 15/691,560, filed Aug. 30, 2017, Varadarajan et al.
U.S. Appl. No. 15/691,562, filed Aug. 30, 2017, Varadarajan et al.
Office Action dated Jun. 13, 2018 issued in U.S. Appl. No. 15/691,560.
Office Action dated Dec. 28, 2018 issued in U.S. Appl. No. 15/691,557.
Notice of Allowance dated Feb. 13, 2019 issued in U.S. Appl. No. 15/691,560.
Office Action dated Jul. 23, 2018 issued in U.S. Appl. No. 15/691,562.
Notice of Allowance dated Feb. 25, 2019 issued in U.S. Appl. No. 15/691,562.
Notice of Allowance dated May 20, 2019 issued in U.S. Appl. No. 15/691,557.
Office Action dated May 15, 2019 issued in U.S. Appl. No. 15/691,560.
Office Action dated Jun. 13, 2019 issued in U.S. Appl. No. 15/691,562.
Welicki et al., "Adaptive Object-Model Builder," ACM, 2009, pp. 1-8. [retrieved on May 13, 2019] <URL:https://dl.acm.org/citation.cfm?id=1943231>.

\* cited by examiner

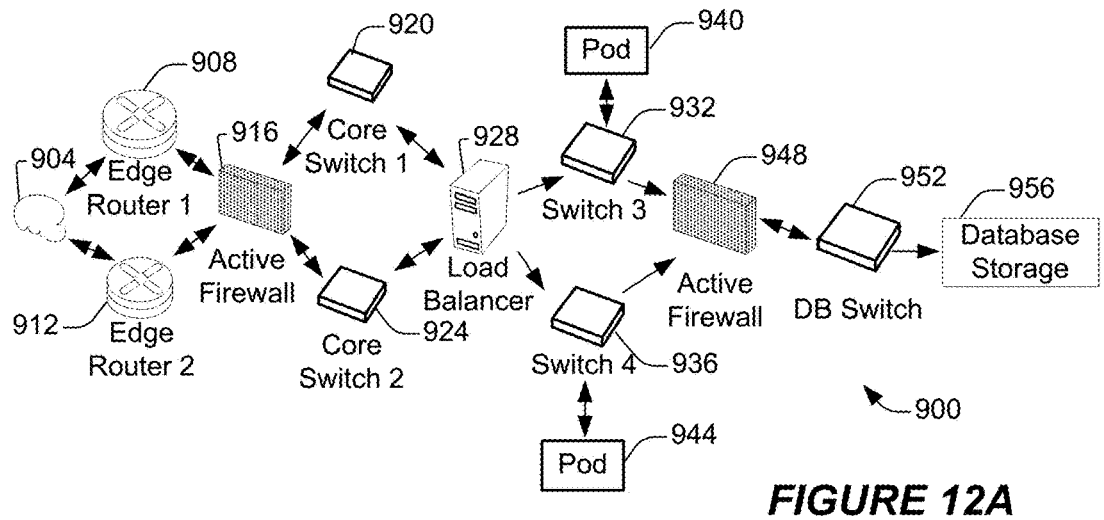
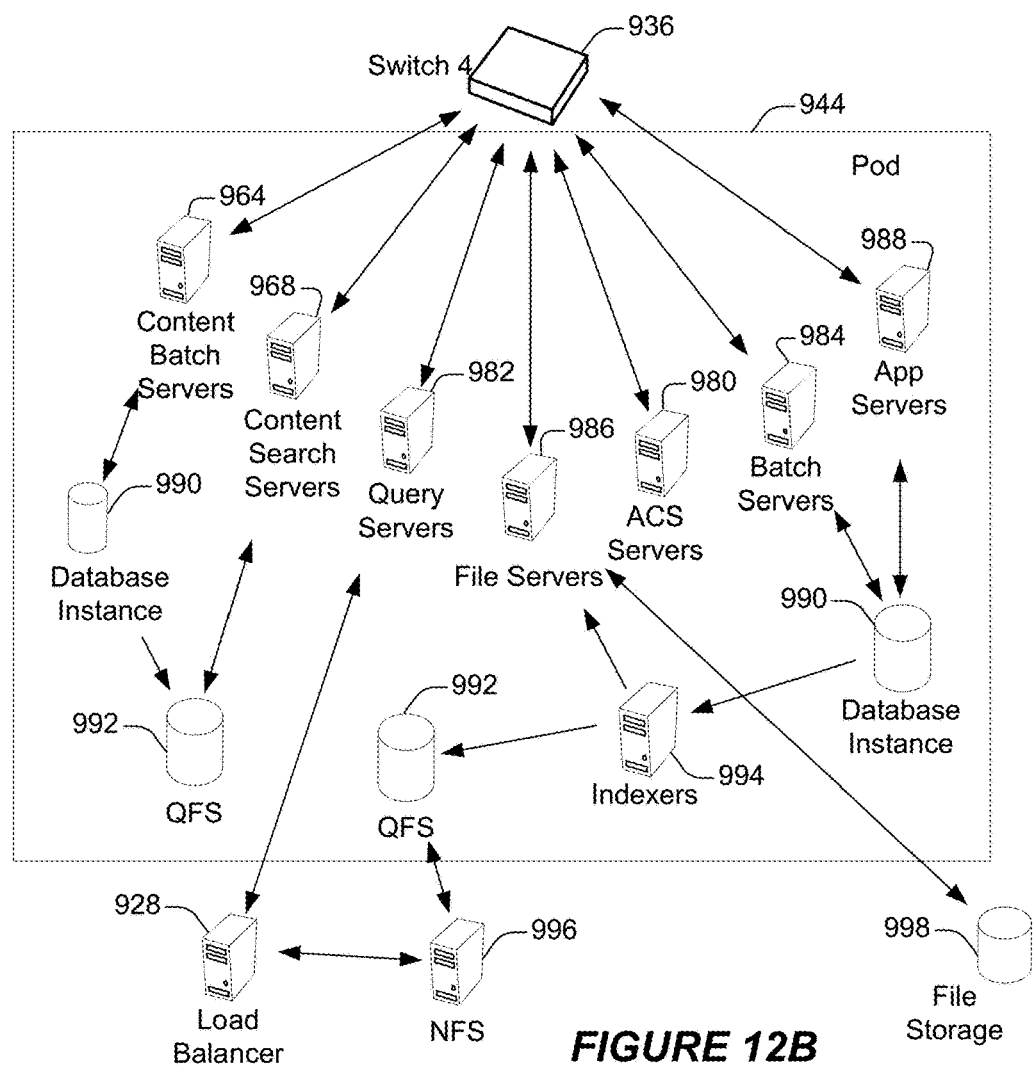
FIGURE 12A
FIGURE 12B

WEB APPLICATION BUILDER FRAMEWORK

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to non-relational database systems, and more specifically to providing a web application builder framework in a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products for providing a web application builder framework in a database system. These drawings in no way limit any changes in form and detail that may be made by one skilled in the art without departing from the spirit and scope of the disclosed implementations.

FIG. 12A shows a system diagram of an example of architectural components of an on-demand database service environment 900, in accordance with some implementations.

FIG. 12B shows a system diagram further illustrating an example of architectural components of an on-demand database service environment, in accordance with some implementations.

DETAILED DESCRIPTION

Figure 1:
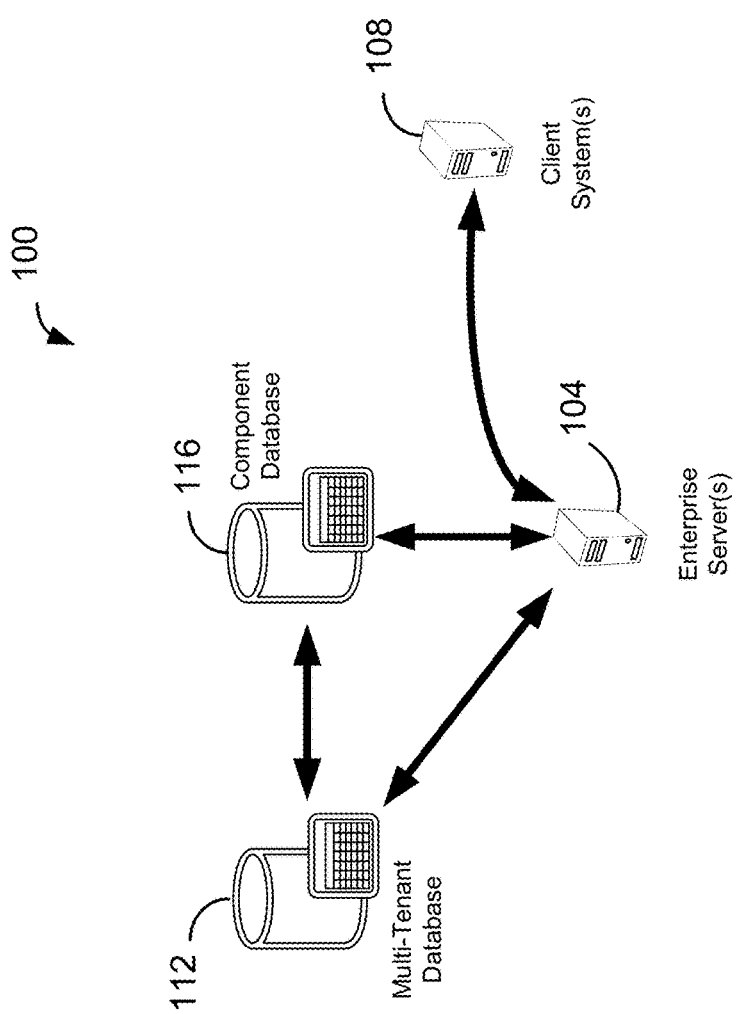
FIG. 1 shows a system diagram of an example of a system 100 for providing a web application builder framework in a database system, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing a web application builder framework in a database system.

Web database environments that allow web applications to be presented to users directly within a browser or other web viewing experience are very popular for several reasons. They allow sophisticated web applications, connected to databases such as multi-tenant databases populated with many millions of records, to be deployed and presented to users on their devices effortlessly, without requiring any download or installation of the application locally. As such web application environments and frameworks gained in popularity, it became increasingly desirable for developers and companies to be able to create their own custom web applications and pages in such environments and frameworks. In some instances, "application builders" became available, allowing developers and non-developers (or "admins") to create such applications and pages using a set of reusable building blocks. For example, a developer may be able to drag-and-drop page components such as a chat window or a clock widget onto a development area, with the application builder constructing a custom web application according to those specifications, with working chat window or clock widget as the developer requested.

While such application builders may provide a flexible set of reusable blocks for many application purposes, many other more specific applications may be desirable for developers and admins that fall outside of the generic set of building blocks. For example, a developer may want to specifically create a community application using a community builder, complete with message forums and social media functionality, or a utility bar editor for creating all sorts of utility bars with various pieces of functional components in them.

By way of illustration, Acme is a company that uses a database environment called Optimum Sales Builder for designing sophisticated web experiences for its marketing campaigns. Optimum Sales Builder has a service called Application Builder that allows Acme to create applications, and Acme has done so to create a web front for its products using some simple building blocks provided in the Application Builder. However, next Acme is interested in creating a Help & Support application specifically for its customers to ask questions, receive help, and connect live to technical support agents to address their needs. While Application Builder provides great functionality for generally building web fronts, it does not provide the components necessary for the more specification application of a Technical Support Application Builder, including components for routing and connecting to live chats with technical support agents, components for building and maintaining web forums, and more. Acme also has other needs for a Community Builder and several other applications that require a more specialized set of building components than what Application Builder offers. Acme wonders if Optimum Sales Builder can provide such specialized builders. Optimum Sales Builder in turn wonders whether it can work on an "Application Builder Builder" that doesn't just provide the means to construct web applications, but provides the means to construct the application builders themselves. That way, using the same reusable building blocks that were used to construct the Application Builder, it can easily create a Community Builder, Technical Support Builder, and dozens of other builders for various needs of its clients.

Some of the disclosed techniques can be implemented to provide a web application builder framework in a database system. A collection of reusable components ("web application builder components") can be presented on a reusable, configurable canvas or user interface for creating "application builders", i.e., tools that can be used for creating web applications and pages. A multi-tenant database is maintained, containing the web application builder components. A user interface is displayed with a selectable list of a subset of the web application builder components. The database system processes a user request to select a web application builder component from the list to be implemented in one or more development areas within the user interface. These components are then presented within the development areas. In some implementations, an operable web application builder is implemented and displayed, with the web application builder component operable in the one or more development areas.

Some of the disclosed techniques can be implemented to provide a base editor component in a web application builder framework. In some implementations, the base editor component is a configurable component of the framework that can handle binding reusable builder pieces together, using a client side metadata model. Using a maintained multi-tenant database of web application builder components, the database system first processes a user request to add to or modify one or more attributes of a web application builder component. The database system then retrieves a metadata model associated with the web application builder component, containing one or more nodes corresponding to the attributes of the web application builder component. The metadata model is then modified by adding or editing one or more nodes based on the user request. The modified metadata model is then stored in one or more server databases.

Some of the disclosed techniques can be implemented to provide for a property editor in a web application builder framework. In some implementations, the property editor component can dynamically generate a list of configurable fields, allowing users to configure properties of various types for reusable components. Using a multi-tenant database of web application builder components, the database system processes a user request to generate a property editor component within the web application builder framework, including one or more user-defined property fields, each associated with at least a text label and user input field. A property editor is then generated based on the user request, and a web application builder framework is displayed, implementing the property editor component on a client device.

Some of the disclosed techniques can be implemented to provide for an interactions layer in a web application builder framework. In some implementations, the interactions layer handles user interactions during the composition of a page. The interactions layer overrides the behavior of reusable components during design time in a web application builder framework, to allow the user to interact with components for designing purposes rather than triggering their various component behaviors. A user interface is displaying containing one or more development areas. User input corresponding to selecting a web application component is processed. The database system then prevents one or more component behaviors of the web application component, and determines one or more builder component behaviors for the component to be performed instead. The component is then presented in the user interface according to a form corresponding to the one or more builder component behaviors.

Applying some implementations of the disclosed techniques, an alternative scenario to that described above is provided. In this alternative scenario, Optimum Sales Builder is able to implement an "Application Builder Framework" that is designed to construct application builders using a set of reusable, configurable web application builder components, including a base editor, property editor, interactions layer, and more. Using this framework, Optimum Sales Builder constructs a Technical Support Builder and Community Builder and provides them to its clients, including Acme. Using these builder tools, Acme can develop its technical support and community applications for its customers.

In some but not all implementations, the disclosed methods, apparatus, systems, and computer-readable storage media may be configured or designed for use in a multi-tenant database environment or system.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

FIG. 1 shows a system diagram of an example of a system 100 for providing a web application builder framework in a database system, in accordance with some implementations. System 100 includes a variety of different hardware and/or software components which are in communication with each other. In the non-limiting example of FIG. 1, system 100 includes at least one enterprise server 104, at least one client system 108, at least one multi-tenant database 112, and at least one component database 116.

Multi-tenant database 112 can allow for storage and retrieval of large sets of data. The multi-tenant database 112 can be a database implemented in HBase or other non-relational database management system. This database can include one or more records for each of a plurality of enterprises (also referred to as organizations, or tenants.) In some implementations, the database can include one or more shared tables, in which multiple enterprises have records in the same table, and share many of the same standard objects and columns for their records. In some implementations, each enterprise is associated with a tenant_id that provides unique identification for that particular enterprise in the multi-tenant database 112. For example, the entity Acme may have a tenant_id of "123" which uniquely identifies Acme as associated with a record or object. No other tenant within a shared table may have the same tenant_id.

Component database 116 is a database that stores a plurality of web components. In some implementations, the components are for use in web applications, web application builders, and/or the web application builder framework. In some implementations, component database 116 may store one or more web application components, web application builder components, or both. In some implementations, component database 116 stores one or more pieces of metadata relating to the web components. In some implementations, component database 116 stores a metadata model for one or more of the web components. In some implementations, the metadata model is in tree structure, with the nodes of the tree consisting of attributes or properties of the web components.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the multi-tenant database 112 or the component database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device such as Google Glass®, another optical head-mounted display (OHMD) device, a smart watch, etc. Client system 108 includes at least one browser in which applications may be deployed.

Figure 2:
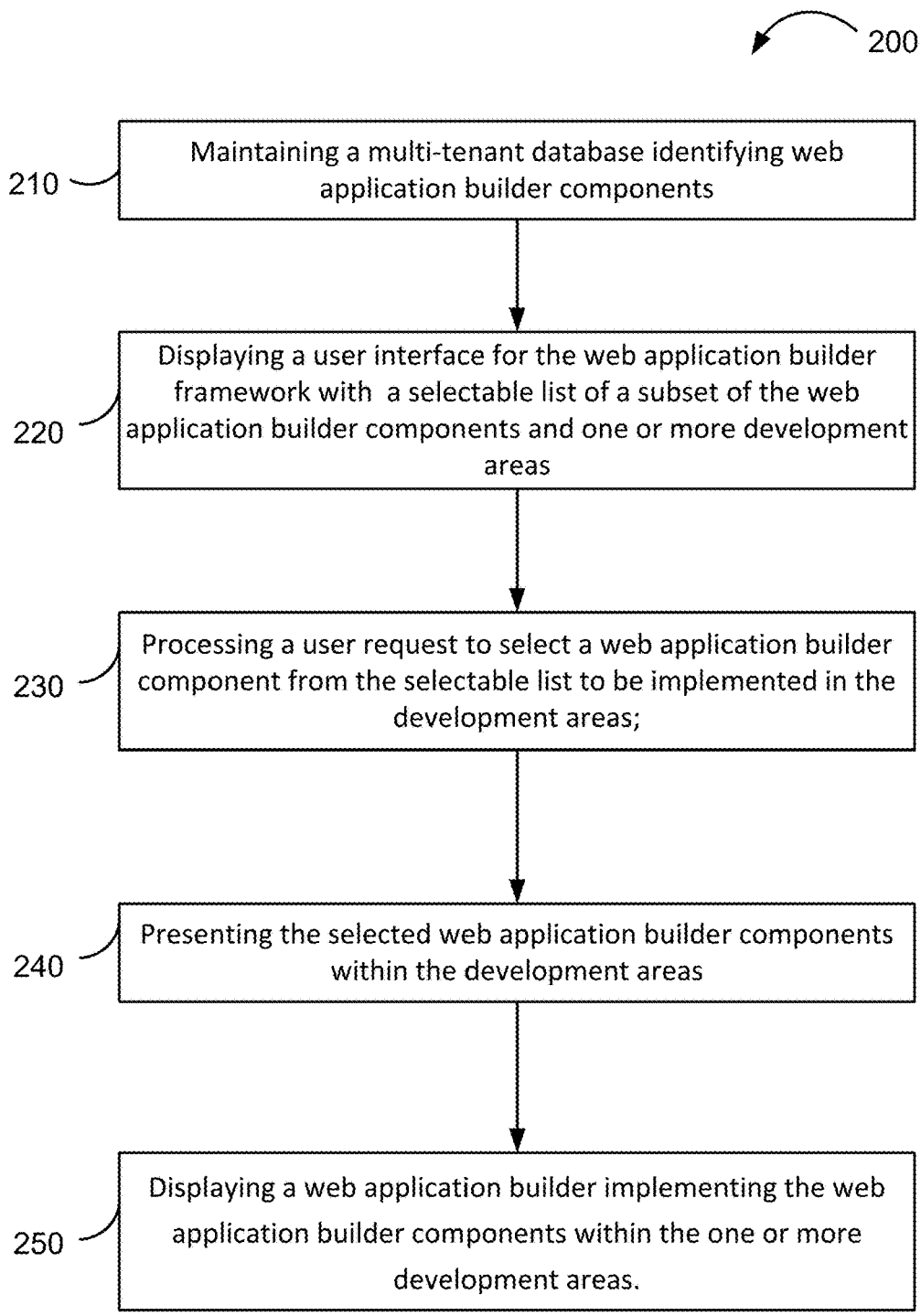
FIG. 2 shows a flowchart of an example of a method 200 for providing a web application builder framework in a database system, performed in accordance with some implementations

FIG. 2 shows a flowchart of an example of a method 200 for providing a web application builder framework in a database system, performed in accordance with some implementations. Method 200 and other methods described herein may be implemented using system 100 of FIG. 1, although the implementations of such methods are not limited to system 100.

At block 210, system 100 maintains a multi-tenant database 112 identifying web application builder components. In some implementations, the multi-tenant database 112 is shared by multiple enterprises. In some implementations, the multiple enterprises are each users of the system 100 and may be able to store and process data in the form of records. The records may be part of a shared table of the multi-tenant database 112. In some implementations, the web application builder components are configured to be reusable within a web application builder framework, and are further configured to construct a plurality of web application components based on user input. In some implementations, one or more pieces of metadata may be stored in the multi-tenant database 112 in relation to the web application builder components. In some implementations, a metadata model may be stored for one or more of the web application builder components.

At block 220, system 100 displays a user interface for the web application builder framework. In some implementations, the user interface includes a selectable list of a subset of the web application builder components. In some implementations, the user interface includes one or more "development areas". Development areas represent a working area for the developers or admins constructing a web application builder. In some implementations, a development area allows for the placement of page or web application design elements, including the placement of web application builder components. In some implementations, the selectable list of web application builder components may be a palette editor. A palette editor shows all of the available web application builder components in a palette, toolbar, list, or other form of displaying the components.

At block 230, system 100 processes a user request to select a web application builder component from the selectable list to be implemented in the one or more development areas. In some implementations, web application builder components within the selectable list can be dragged and dropped from the list into the development area. In some implementations, one or more other user inputs may be used to select or place a web application component.

At block 240, system 100 presents the selected web application builder components within the one or more development areas. In some implementations, presenting the components in the development areas consists of presenting a graphical representation representing the web application components within a region of the development areas that the user selected for placement. In some implementations, the graphical representation of a web application builder component is based on the object type or component type of web application builder component.

At block 250, system 100 displays a web application builder. In some implementations, system 100 implements the selected web application builder components within the one or more development areas of the web application builder. In some implementations, the development areas have been rendered into the user interface environment of the web application builder, or "canvas", where a user of the builder can interact with web application components, place components in various positions on a page, and otherwise use all of the potential interface elements of a web application builder. In some implementations, the web application builder is configured to be executable on one or more browsers or other web navigation applications operating on one or more client devices.

In some implementations, system 100 processes a second user request to modify the selected web application builder components within the one or more development areas. In some implementations, the request to modify involves a modification of one or more properties or attributes of the web application builder components. In some implementations, system 100 updates the selected web application builder components within the one or more development areas. In some implementations, system 100 also updates the component database 116 to reflect the modifications to the web application builder components. In some implementations, the request to modify is a request to add or remove one or more web application builder components. In some implementations, system 100 may accordingly add or remove the web application builder components from the developmental areas, and/or add or remove the components from the component database 116.

Figure 3:
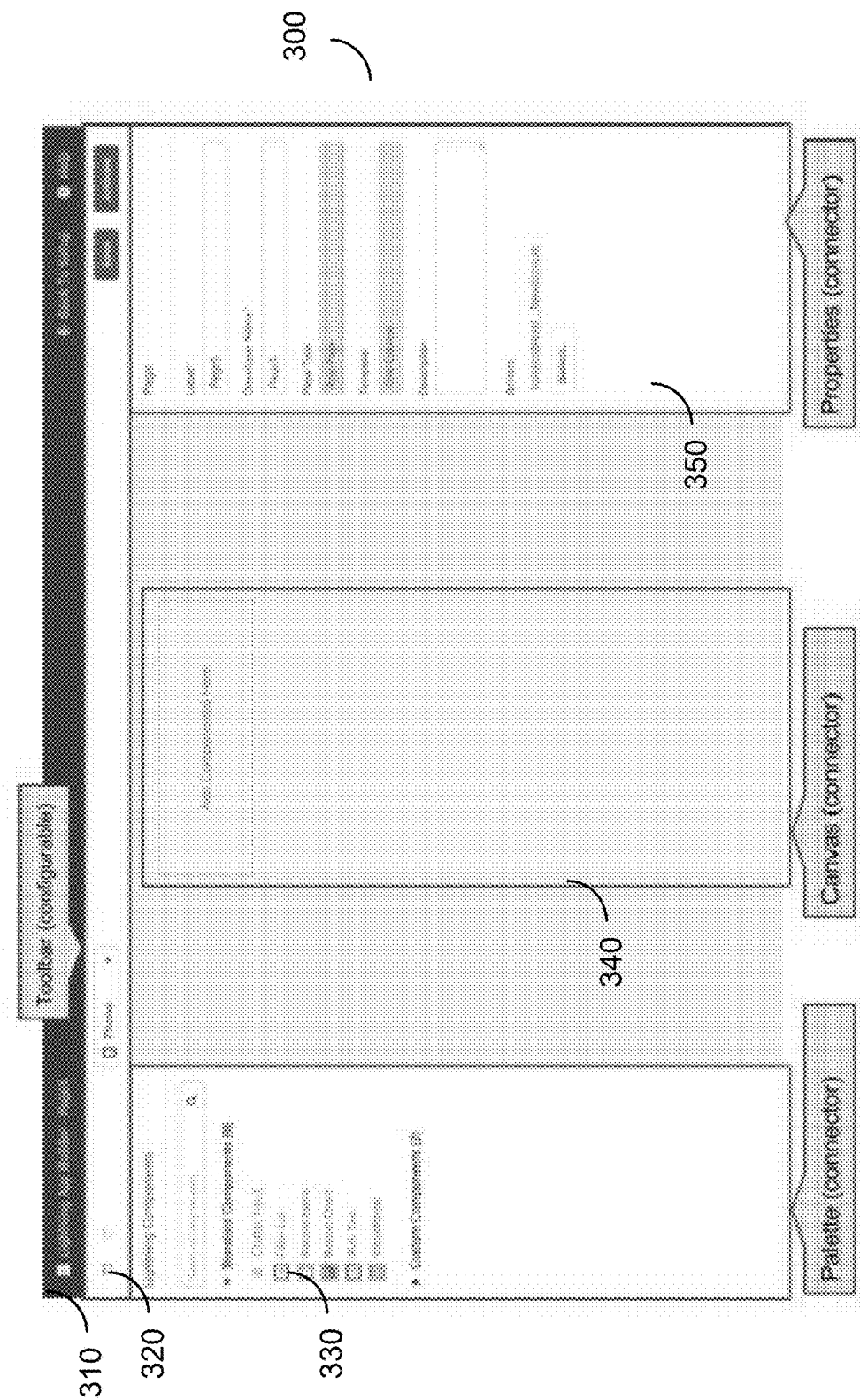
FIG. 3 shows an example of a web application builder constructed with a web application builder framework, in accordance with some implementations.

FIG. 3 shows an example of a web application builder constructed with a web application builder framework, in accordance with some implementations. Example screenshot 300 shows a web application builder with a title 310, toolbar 320, palette 330, canvas 340, and properties 350. In some implementations, the web application builder is presented to a user as a user interface that can be interacted with to construct web applications.

The title 310 shows the name of the web application builder, Lightning App Builder. It also shows the name of the web application being built, in this case, Page5. The toolbar 320 is a toolbar presented to the user that can be used to navigate menus and menu options for constructing web applications. In some implementations, the toolbar can be configured by the user of the web application builder.

The palette 330 is a selectable list of one or more web application components that can be used and reused to construct web applications. For example, one of the web application components is "Rich Text", which places a rich text field within the web application. In some implementations, the web application components can be presented as, or alongside, graphical representations indicating an object type or component type of the web application component. In some implementations, the web application components may be standard components, provided by default to users, or custom components that were created by or specifically for the user of the web application builder for use in building web applications.

The canvas 340 is an area where a user of the web application builder can design and lay out web applications or pages in a visual way. In some implementations, the user can drag one or more selectable components from the palette 330 into the canvas 340 to place them on the canvas. In some implementations, indications appear in areas of the canvas 340 where components may be placed, such as a border with text "Add Component(s) Here".

The properties 350 is an area of the web application builder where users may view and modify one or more properties or attributes of a web application component or an object, either in the canvas 340, palette 330, or some other area of the web application builder. In some implementations, fields such as "Label", "Descriptive Name", "Page Type", and more may designate the corresponding property or attribute, and one or more text fields of drop-down boxes may allow a user to modify attributes or properties. Various interactive elements, including buttons, may also appear to allow the user to view and/or modify properties of various aspects of web application components and objects.

Figure 4:
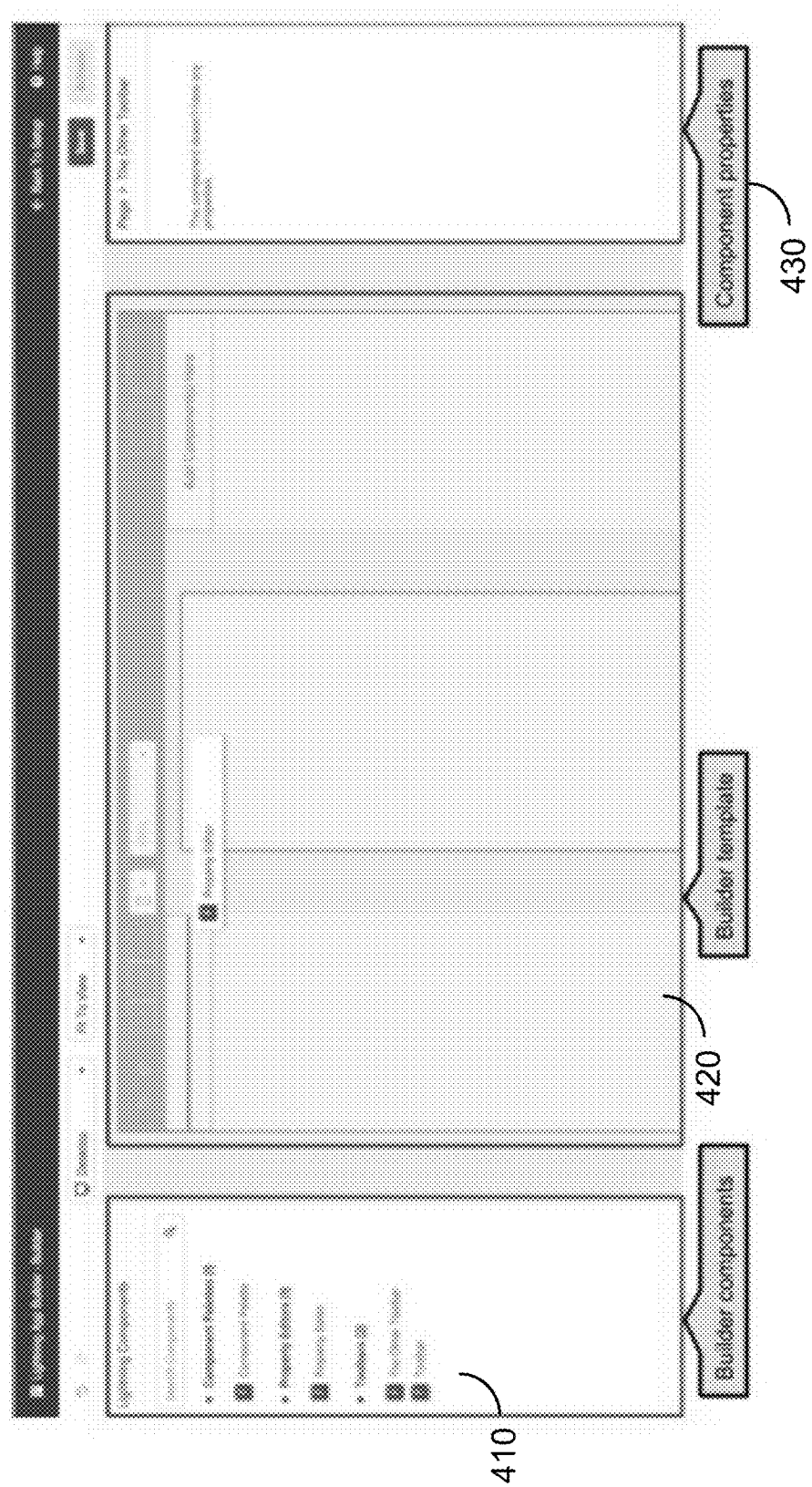
FIG. 4 shows an example of a web application builder framework, in accordance with some implementations.

FIG. 4 shows an example of a web application builder framework, in accordance with some implementations. An example screenshot shows a builder component palette 410, a development area or builder template 420, and component properties or property editor 430. In some implementations, the web application builder framework is presented to a user as a user interface that can be interacted with to construct web application builders.

The builder component palette 410 is a selectable list of one or more web application builder components. In the example screenshot, web application builder components include Component Palette, Property Editor, and Toolbars. For example, a Component Palette can be selected from the builder component palette 410 and dragged into the development area 420. The result would be the creation of a web application builder with a palette, equivalent to the palette 330 in the web application builder of FIG. 3. In some implementations, graphical representations may replace or exist alongside the names of the web application builder components.

The development area or builder template 420 is the work area where a user can visually construct a web application builder. In some implementations, one or more existing templates may be used to construct a web application builder. For example, a user may want to start with a template for a Community Builder, then modify that template to his or her needs. In this example, the user is in the process of configuring a Property Editor web application builder component for a specific use.

Component properties or property editor 430 is an editor for configurable menus of properties or attributes of web application builder components. In some implementations, users of the web application builder framework can create configurable fields for properties of web application components in a web application builder. Then, when users of the web application builder construct an application, they can configure properties or attributes of web application components according to how the property editor has allowed the user to configure them.

Figure 5:
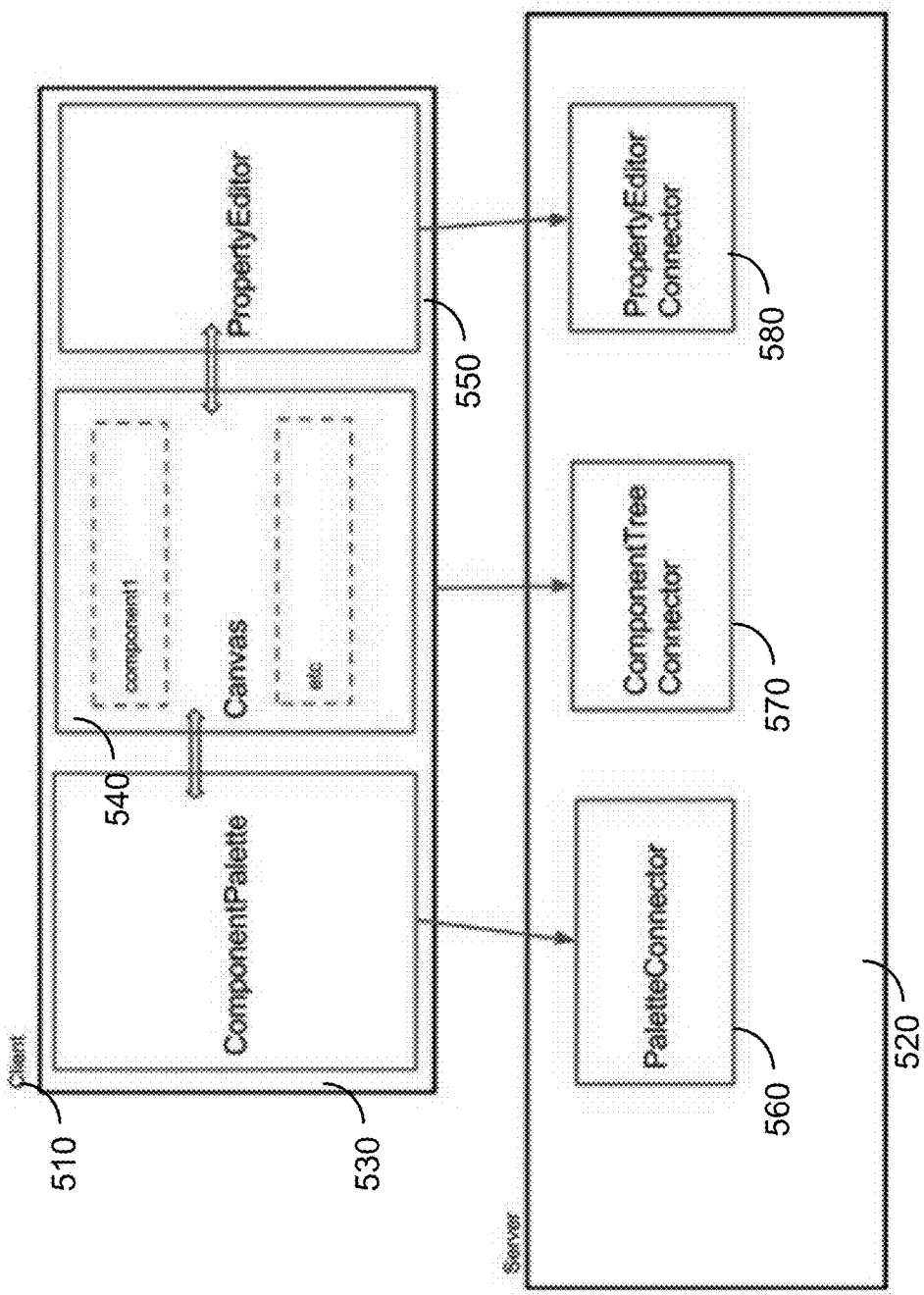
FIG. 5 shows an example layout of web application builder components in a web application builder framework, in accordance with some implementations.

FIG. 5 shows an example layout of web application builder components in a web application builder framework, in accordance with some implementations. A client-side model 510 is shown with builder component palette 530, development area 540, and property editor 550. A server-side model 520 is shown with a palette connector 560, component tree connector 570, and property editor connector 580.

The client-side model 510 illustrates the elements of the web application builder framework on a client device as presented to a user. The user of the web application framework has a builder component palette 530 to select from a selectable list of web application builder components. The user also has a development area or canvas 540 to construct a web application builder visually. A web application builder component named "component1" is placed within the canvas 540, for example. A property editor 550 allows properties of various web application builder components to be edited.

The server-side model 520 uses a connector framework to allow the client-side model elements and components to communicate with the server. In some implementations, the connector framework provides a common generic interface layer for users to plug in serialization models for web application builders they wish to construct. For example, an App Builder may serialize to and from certain page components. In some implementations, the connector framework provides functionality for users to specify which component and services are to be used for their builder project. System 100 looks up the components/services on the server side, and system 100 then fetches the data, refreshes the data, and otherwise handles the data in an organized and serialized way. Palette connector 560, component tree connector 570, and property editor connector 580 are examples of components and services that use the connector framework to communicate and send data to and from the client device and server.

Figure 6:
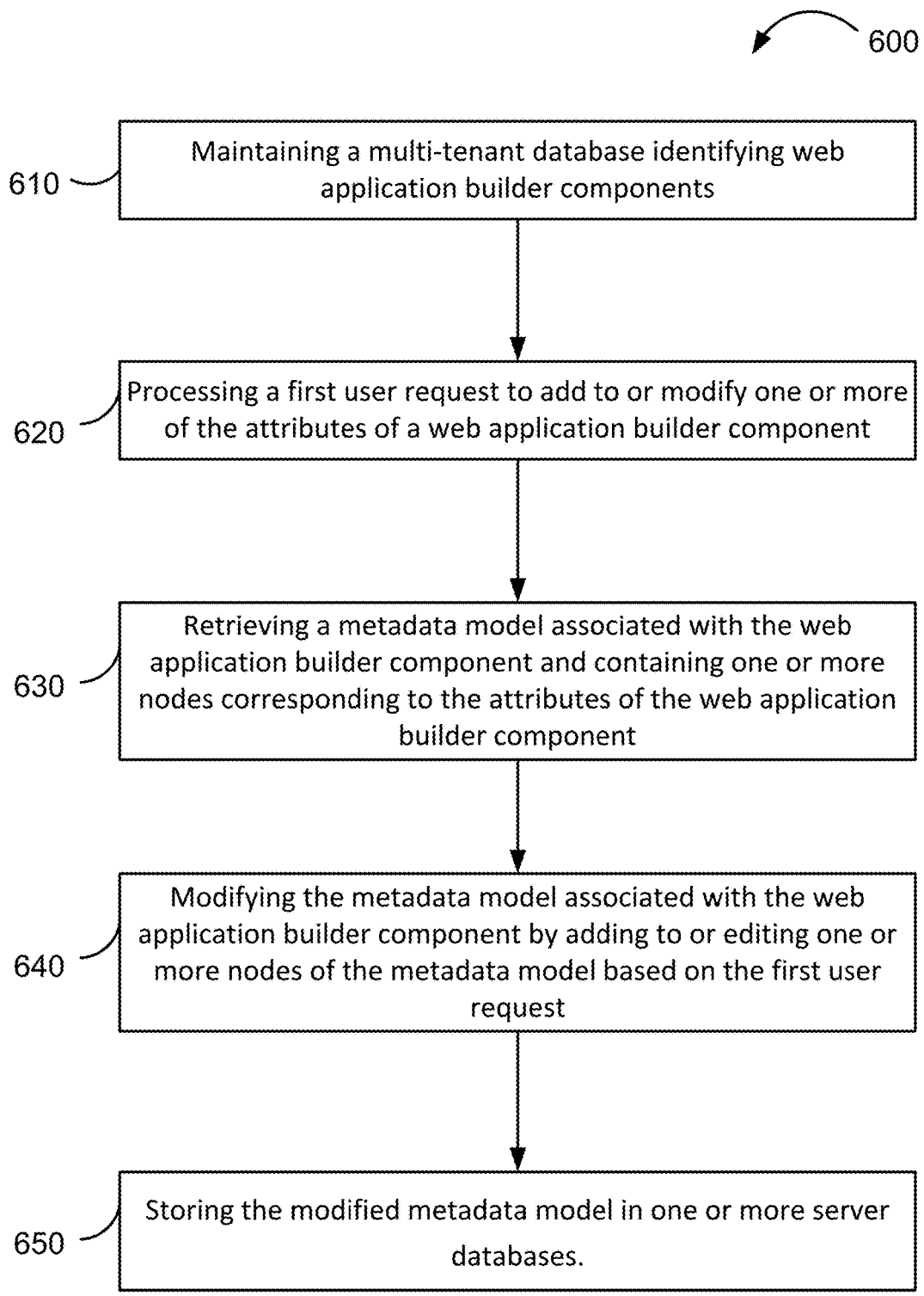
FIG. 6 shows a flowchart of an example of a method 600 for providing a base editor component in a web application builder framework, performed in accordance with some implementations.

FIG. 6 shows a flowchart of an example of a method 600 for providing a base editor component in a web application builder framework, performed in accordance with some implementations.

At block 610, system 100 maintains a multi-tenant database 112 identifying web application builder components. In some implementations, the multi-tenant database 112 is shared by multiple enterprises. In some implementations, the multiple enterprises are each users of the system 100 and may be able to store and process data in the form of records. The records may be part of a shared table of the multi-tenant database 112. In some implementations, the web application builder components are configured to be reusable within a web application builder framework, and are further configured to construct a plurality of web application components based on user input. In some implementations, one or more pieces of metadata may be stored in the multi-tenant database 112 in relation to the web application builder components. In some implementations, a metadata model may be stored for one or more of the web application builder components.

At block 620, system 100 processes a user request to add to or modify one or more of the attributes of a web application builder component. In some implementations, the attributes of a web application builder component may include, for example, a label, descriptive name, size and boundary, visibility, permissions, and more. In some implementations, adding to the attributes of a web application builder component may involve adding one or more additional attributes to a web application builder component. In some implementations, the web application builder component is a page component for a web application builder page. In some implementations, the attributes of the web application builder component correspond to one or more regions or development areas of the web application builder page.

At block 630, system 100 retrieves a metadata model associated with the web application builder component. In some implementations, the metadata model contains one or more nodes corresponding to the attributes of the web application builder component. In some implementations, the metadata model may represent one of a number of data structures for representing the metadata for a given web application builder component. In some implementations, the metadata model is a client-side model retrieved from one or more client devices. In some implementations, system 100 displays a user interface on a client device, allowing a user to interact with a number of user interface elements associated with viewing and modifying the metadata model.

At block 640, system 100 modifies the metadata model associated with the web application builder component by adding to or editing one or more nodes of the metadata model based on the first user request. In some implementations, the nodes may represent properties or attributes of the web application builder components, and are capable of being configured, modified, added to, or removed for any given component. In some implementations, the nodes are added to or edited locally on one or more client devices.

At block 650, system 100 stores the modified metadata model in one or more server databases. In some implementations, the server databases may be multi-tenant database 112 or component database 116. In some implementations, the modified metadata model is cached locally in addition to being stored on the server. In some implementations, system 100 retrieves the web application builder component from the database at a later time, for local access on one or more client devices. In some implementations, system 100 displays a web application builder framework implementing the web application builder component with the modified metadata model.

Figure 7:
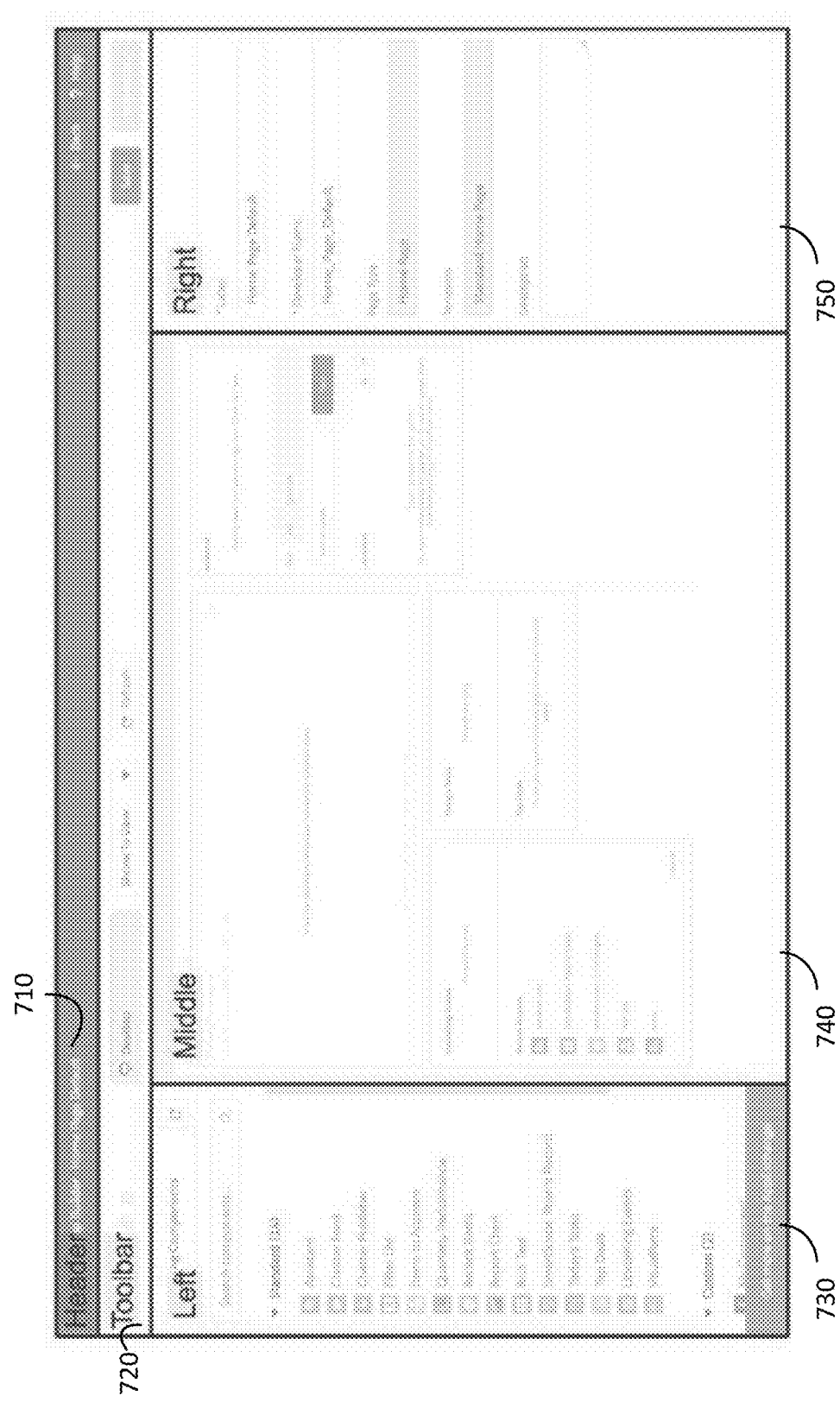
FIG. 7 shows an example layout of a base editor with configurable components in a web application builder, in accordance with some implementations.

FIG. 7 shows an example layout of a base editor with configurable components in a web application builder, in accordance with some implementations. The example screenshot shows various elements of a web application builder page, showing how different web application builder components can be added to (i.e., extended) or edited to configure generic builder components to suit the needs of particular builders.

Header 710 shows a builder name and a project name. In some implementations, the header 710 is configurable. In some implementations, the header can contain, or be configured by a user to contain, elements such as a back button or a help menu item. Toolbar 720 shows toolbar elements for the web application builder, including a desktop view, a "Shrink to View" option in a drop-down menu, and a refresh button. In some implementations, the toolbar 720 can be configurable to add elements to the toolbar such as a form factor switcher, activation button, a save button, a zoom button for the canvas or development area, and more.

Left region 730 of the web application builder can be configured such that a palette can be implemented, such as in the example screenshot. In some implementations, the components listed within the selectable list of web application components can be configured by the user. In some implementations, the left region 730 can automatically reconfigure the list of components if one or more components do not exist or cannot be retrieved from the client, local cache, or server. In some implementations, middle region 740 and right region 750 offer similarly configurable aspects. In some implementations, bindings can be configured by the user such that different events within the builder automatically and dynamically affect the attributes or properties of web application builder components. For example, a user may configure what should happen within the builder when an addComponent event is triggered. Another example may be that the user can reconfigure what happens when a user of the application builder moves a component from the palette into the canvas or development area.

Figure 8:
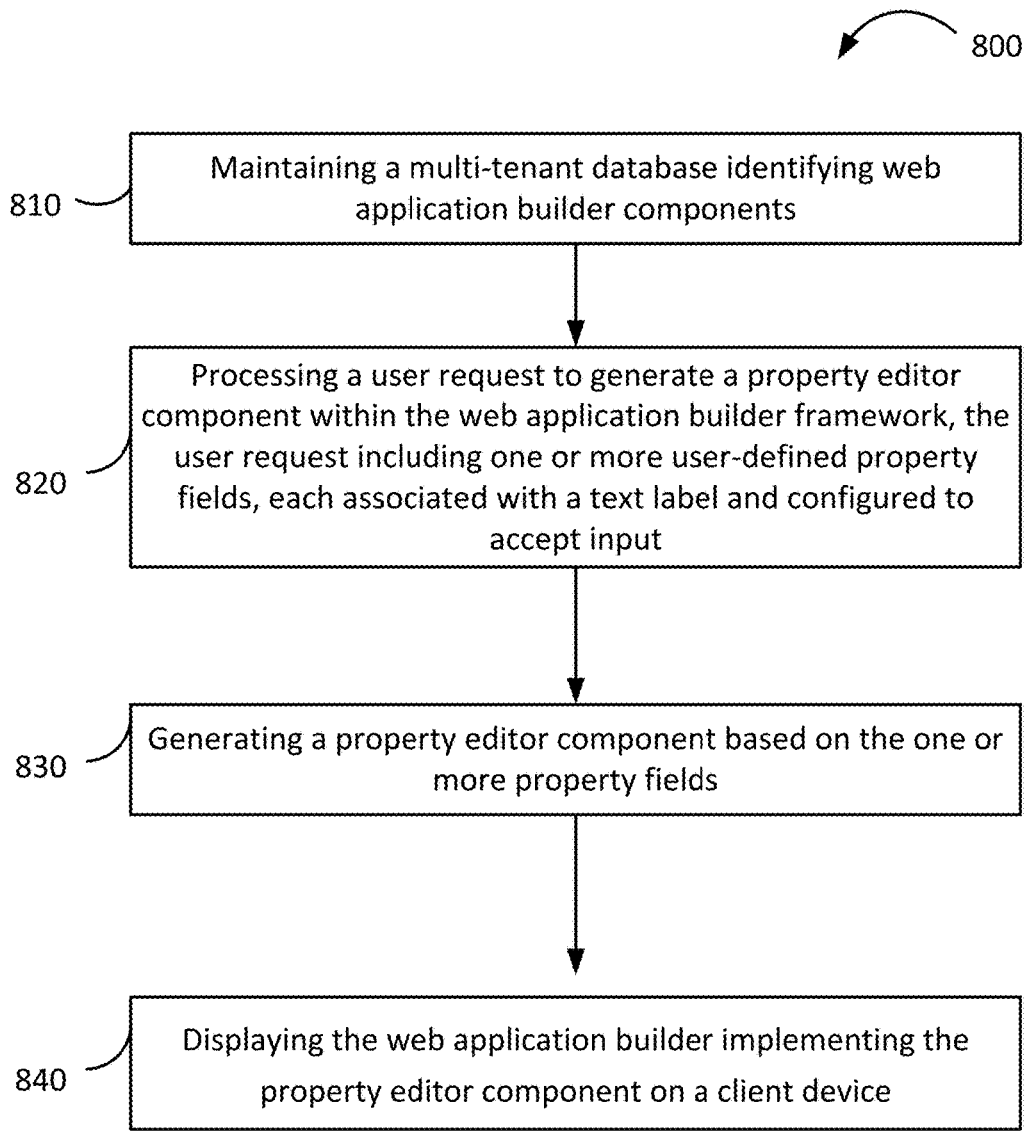
FIG. 8 shows a flowchart of an example of a method 800 for providing a property editor component in a web application builder framework, performed in accordance with some implementations.

FIG. 8 shows a flowchart of an example of a method 800 for providing a property editor component in a web application builder framework, performed in accordance with some implementations.

At block 810, system 100 maintains a multi-tenant database 112 identifying web application builder components. In some implementations, the multi-tenant database 112 is shared by multiple enterprises. In some implementations, the multiple enterprises are each users of the system 100 and may be able to store and process data in the form of records. The records may be part of a shared table of the multi-tenant database 112. In some implementations, the web application builder components are configured to be reusable within a web application builder framework, and are further configured to construct a plurality of web application components based on user input. In some implementations, one or more pieces of metadata may be stored in the multi-tenant database 112 in relation to the web application builder components. In some implementations, a metadata model may be stored for one or more of the web application builder components.

In some implementations, system 100 displays a user interface on a client device that allows a user to request the generation of a property editor component. In some implementations, the user interface element can include a number of interactive elements. In some implementations, the user interface element is visual in nature and intended for non-developers or admins to easily generate property editor components according to their specifications.

At block 820, system 100 processes a user request to generate a property editor component within the web application builder framework. In some implementations, the user request includes one or more user-defined property fields, each associated with a text label and configured to accept input. In some implementations, a property editor component is a component that allows a user of a web application builder framework to construct application builders in which users can edit the properties of application components. In some implementations, a property field may be user-defined and configurable in various ways, as well as reusable in different applications. In some implementations, property fields are associated with specific web application components or web application builder components. In some implementations, property fields are configured to accept input on a client device using input interface elements, such as a text field.

In some implementations, at least one of the property fields is associated with a drop-down input box that may or may not be user-defined. In some implementations, system 100 determines one or more drop-down input box options associated with at least one of the attributes of the web application builder components, with the drop-down input box containing the one or more drop-down input box options.

At block 830, system 100 generates a property editor component based on the one or more property fields. For example, a user request to generate property editor may include 5 property fields, each with a user input accepted to configure or redefine the property field. At block 840, system 100 displays the web application builder on a client device, implementing the property editor component according to the specifications of the user of the web application builder framework. In some implementations, the property editor component contains one or more pre-defined property fields, one or more user-defined property fields, or some combination of both.

In some implementations, system 100 displays a web application builder for constructing web applications within one or more client devices, with an implementation of one or more property sheets based on the property editor component. In some implementations, property sheets may be configurable or non-configurable. In some implementations, the one or more property sheets represent the one or more property fields.

Figure 9:
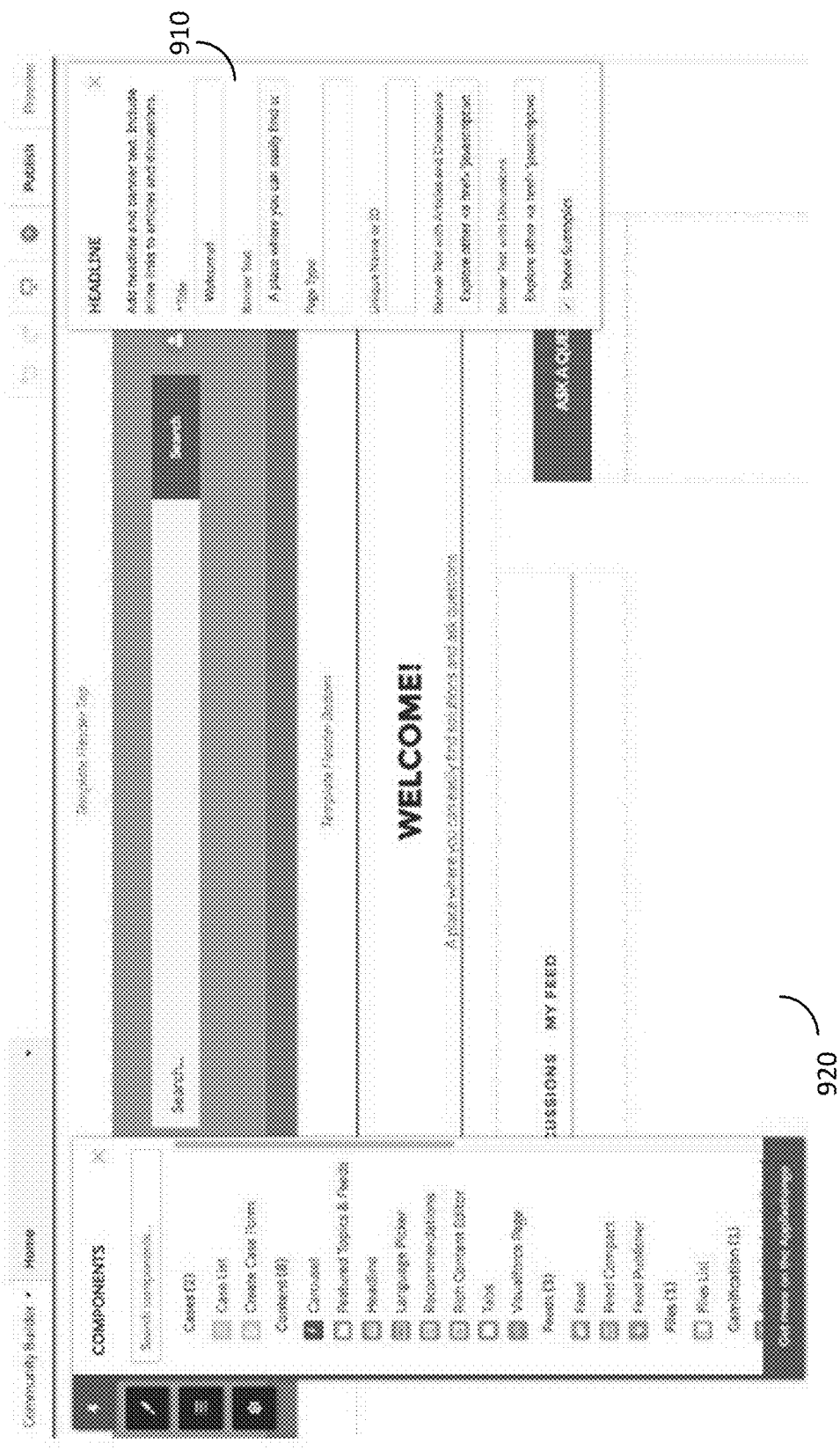
FIG. 9 shows an example of a property editor constructed with a web application builder framework, in accordance with some implementations.

FIG. 9 shows an example of a property editor constructed with a web application builder framework, in accordance with some implementations. In the example screenshot, a web application builder is displayed in a user interface on a client device. A property editor 910 has been generated through a web application builder framework, pertaining to a Headline web application component. The property editor 910 includes the fields Title, Banner Text, Page Type, Unique Name or ID, Banner Text with Articles and Discussions, and Banner Text with Discussions, all relating to attributes or properties of the Headline web application component. Each of these fields includes an element to accept user input. For example, the Title field includes a text field that accepts user input, such as "Welcome!" A checkbox for Show Subtopics is also included. The canvas 920 has web application components incorporated into a design in progress for a web application. The headline visually implemented in the canvas 920 is modified during run-time based on the values of the properties in the property editor 910. For example, if "Welcome!" was changed to another headline title, then the canvas 920 would reflect this instantaneously or near-instantaneously during the design period in real time.

Figure 10:
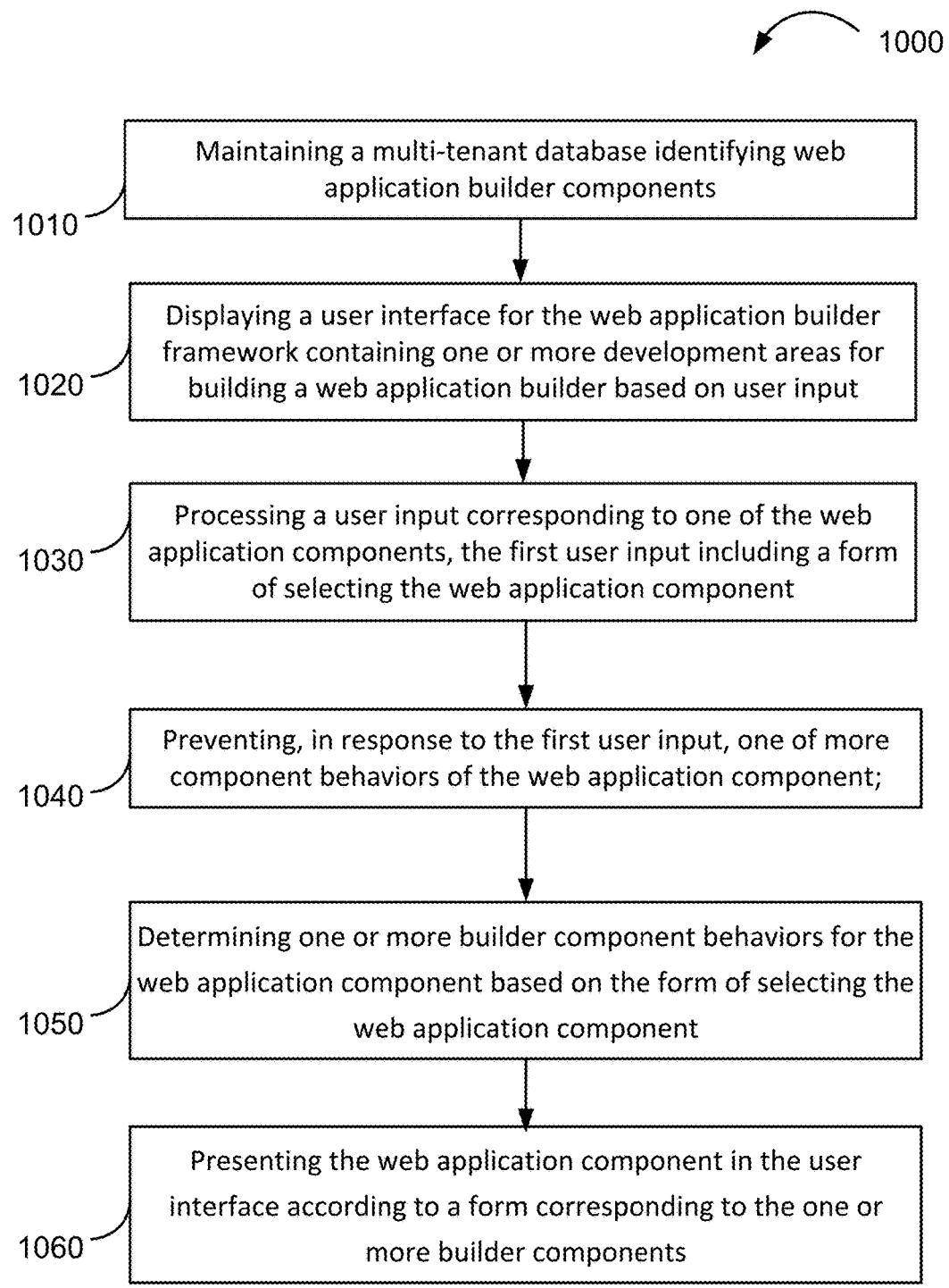
FIG. 10 shows a flowchart of an example of a method 1000 for providing an interactions layer in a web application builder framework, performed in accordance with some implementations.

FIG. 10 shows a flowchart of an example of a method 1000 for providing an interactions layer in a web application builder framework, performed in accordance with some implementations.

At block 1010, system 100 maintains a multi-tenant database 112 identifying web application builder components. In some implementations, the multi-tenant database 112 is shared by multiple enterprises. In some implementations, the multiple enterprises are each users of the system 100 and may be able to store and process data in the form of records. The records may be part of a shared table of the multi-tenant database 112. In some implementations, the web application builder components are configured to be reusable within a web application builder framework, and are further configured to construct a plurality of web application components based on user input. In some implementations, one or more pieces of metadata may be stored in the multi-tenant database 112 in relation to the web application builder components. In some implementations, a metadata model may be stored for one or more of the web application builder components.

At block 1020, system 100 displays a user interface for the web application builder framework. In some implementations, the user interface includes a selectable list of a subset of the web application builder components. In some implementations, the user interface includes one or more "development areas". Development areas represent a working area for the developers or admins constructing a web application builder. In some implementations, a development area allows for the placement of page or web application design elements, including the placement of web application builder components. In some implementations, the selectable list of web application builder components may be a palette editor. A palette editor shows all of the available web application builder components in a palette, toolbar, list, or other form of displaying the components.

At block 1030, system 100 processes a user input corresponding to one of the web application components, including a form of selecting the web application builder component. In some implementations, web application builder components can be dragged and dropped from the list into the development area. In some implementations, one or more other user inputs may be used to select or place a web application builder component. In some implementations, any part of a graphical representation of a component may be clicked on, swiped, pinched, or otherwise gestured in relation to in order to be selected in some way. In some implementations, hovering, dragging, dropping, pointing to, clicking on, or gesturing all represent forms of selecting the web application builder component.

At block 1040, system 100 prevents one or more component behaviors of the web application builder component. In some implementations, component behaviors are specified within one or more attributes or properties of web application builder components. For example, within an external repository web application builder component, clicking on a file directory may open that file directory. In a text field component, clicking on the text field may prompt the user to enter text. In some implementations, the component behaviors are retrieved from a metadata model corresponding to the web application builder component. In some implementations, the component behaviors are functions that relate to one or more selectable areas within the web application component.

At block 1050, system 100 determines one or more builder component behaviors for the web application builder component based on the form of selecting the web application builder component. In some implementations, builder component behaviors may be specified by one or more users by editing or adding to properties or attributes of the corresponding web application builder component. In some implementations, builder component behaviors represent behaviors that override the existing component behaviors for when a user clicks or otherwise selects the component. Builder component behaviors are designed to allow a user to treat a component as a development item that can, for example, be dragged around a canvas in an object container, selected along with other components, or batch edited. Rather than a file directory being clicked on and having the file structure being navigated, a developer would prefer to have a click represent that object being selected for design and layout purposes within the web application builder framework. In some implementations, the builder component behaviors are retrieved from a metadata model corresponding to the web application builder component. In some implementations, the builder component behaviors are functions relating to selecting a representation of the web application builder component, with the representation standing for a defined object inside the one or more development areas. In some implementations, the builder component behaviors can be defined or customized by a user of either the web application builder framework or the web application builder. In some implementations, the builder component behaviors present a detailed view of the web application builder component within the user interface.

At block 1060, system 100 presents the web application builder component in the user interface, according to a form corresponding to the builder components. For example, if a builder component behavior specifies that clicking on an external repository component will merely select it in the canvas, then system 100 will present the component in precisely that form within the user interface. Thus, user interactions during the builder framework design experience can say consistent regardless of the component and its particular behaviors upon being interacted with.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 11A:
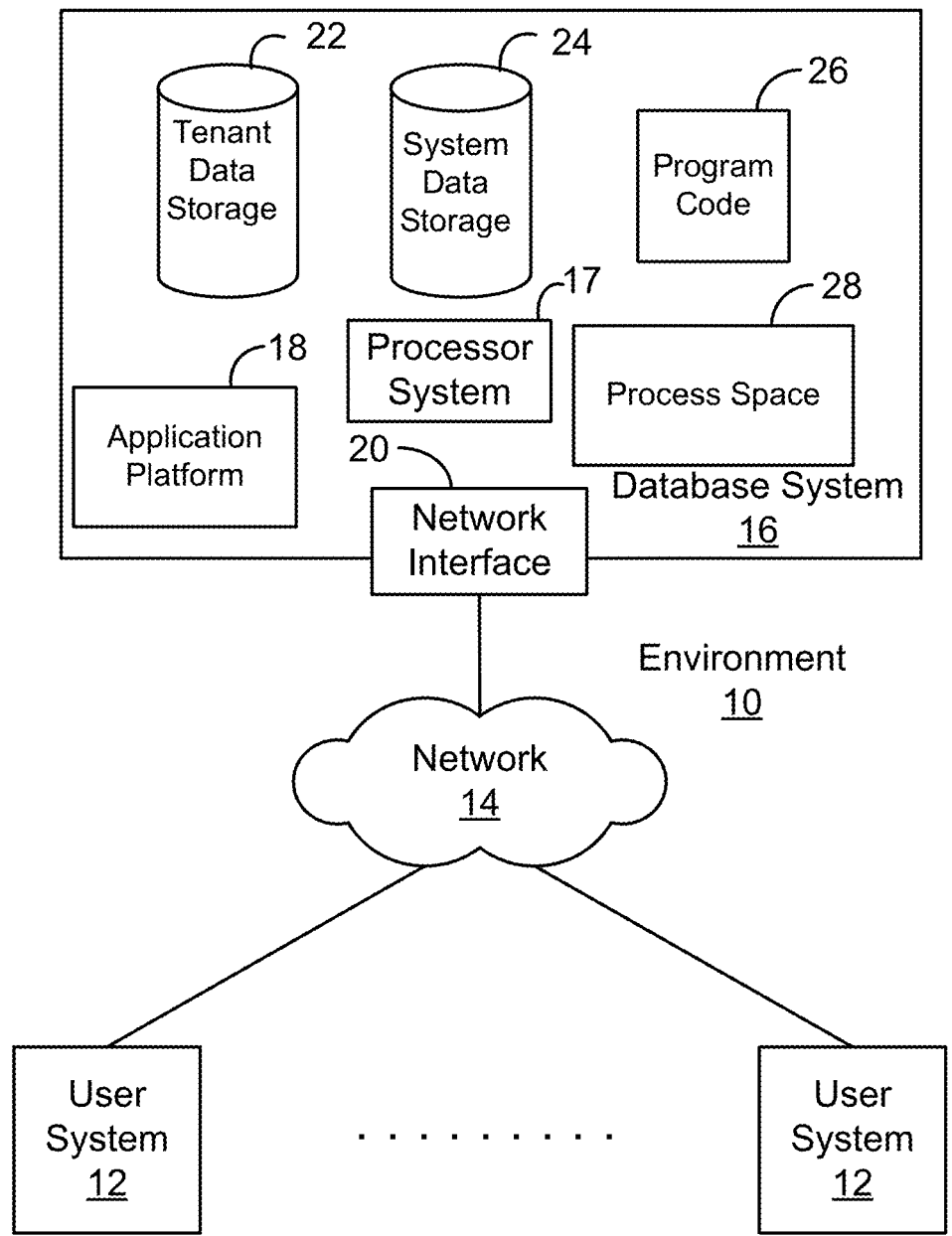
FIG. 11A shows a block diagram of an example of an environment 10 in which an on-demand database service can be used in accordance with some implementations.

FIG. 11A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 11A (and in more detail in FIG. 11B) user systems 12 might interact via a network 14 with an on-demand database service, which is implemented in the example of FIG. 11A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). A non-relational database management system (NRDBMS) or the equivalent may execute storage and fast retrieval of large sets of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 11A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 11B:
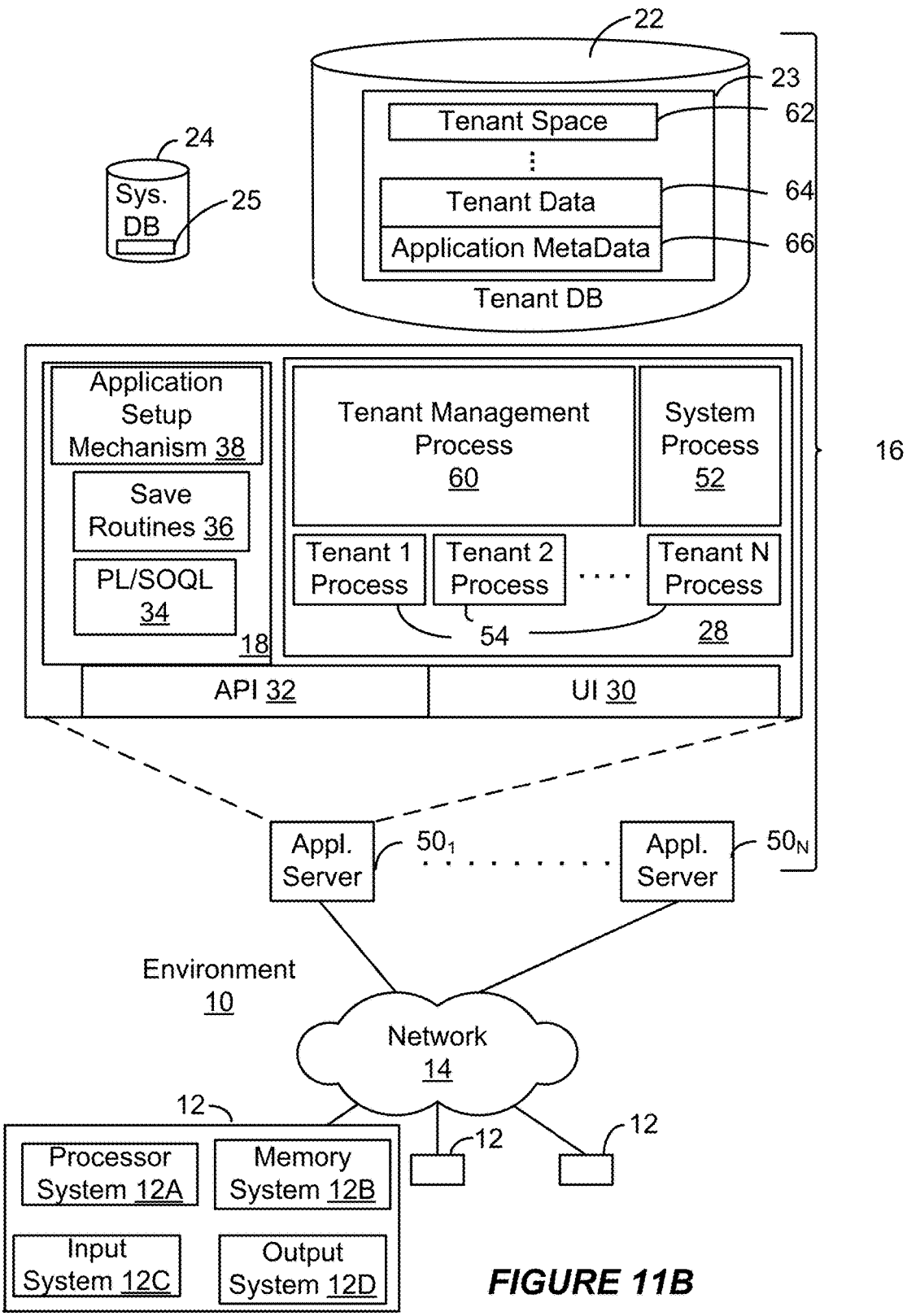
FIG. 11B shows a block diagram of an example of some implementations of elements of FIG. 11A and various possible interconnections between these elements.

One arrangement for elements of system 16 is shown in FIGS. 11A and 11B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 11A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 11B shows a block diagram of an example of some implementations of elements of FIG. 11A and various possible interconnections between these elements. That is, FIG. 11B also illustrates environment 10. However, in FIG. 11B elements of system 16 and various interconnections in some implementations are further illustrated. FIG. 11B shows that user system 12 may include processor system 12A, memory system 12B, input system 12C, and output system 12D. FIG. 11B shows network 14 and system 16. FIG. 11B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 11A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 11B, system 16 may include a network interface 20 (of FIG. 11A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 12A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 12A and 12B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 12A and 12B, some implementations of an on-demand database service environment may include anywhere from one to many devices of each type. Also, the on-demand database service environment need not include each device shown in FIGS. 12A and 12B, or may include additional devices not shown in FIGS. 12A and 12B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 12B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 12A and 12B.

FIG. 12B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system comprising one or more processors, the database system configurable to cause:
providing, for interaction with a database, an identification of a plurality of web application builder components configured to be used to build a plurality of components of a web application and further configured to be reusable within a server-hosted web application builder framework;
displaying on a client device a user interface for the web application builder framework, the user interface comprising:
a selectable list of a subset of the web application builder components, and
one or more development areas for building a web application builder based on user input;
processing a first user request to select one or more of the subset of web application builder components from the selectable list to be implemented in the one or more development areas;
implementing, in response to the first user request, the selected one or more web application builder components in the one or more development areas;
configuring, in response to first user input, a first one or more attributes of one or more component behaviors of the selected one or more web application builder components;
retrieving a metadata model associated with the selected one or more web application builder components;
modifying the metadata model by at least adding to or editing one or more nodes of the metadata model, the one or more nodes associated with the first one or more attributes;
storing the modified metadata model in a database; and
displaying on one or more client devices the web application builder for constructing web applications, the web application builder implementing at least the one or more web application builder components implemented in the one or more development areas.

2. The system of claim 1, the database system further configurable to cause:
processing a second user request to modify the one or more web application builder components within the one or more development areas; and
updating, in response to the second user request, the one or more web application builder components within the one or more development areas.

3. The system of claim 2, wherein the second user request to modify the one or more web application builder components comprises at least one of: adding, removing, or modifying one or more attributes of the one or more web application builder components.

4. The system of claim 1, wherein the first user request comprises a drag-and-drop movement of the selected one or more web application builder components onto at least a portion of the one or more development areas.

5. The system of claim 1, wherein the selectable list of web application builder components comprises one or more graphical representations of the web application builder components.

6. The system of claim 1, wherein implementing the selected one or more web application builder components in the one or more development areas comprises presenting a graphical representation of the one or more web application builder components according to a component type.

7. The system of claim 1, wherein the web application builder and the web application builder framework are browser applications configured to be executable on one or more browsers operating on one or more client devices.

8. A method comprising:
providing, for interaction with a database, an identification of a plurality of web application builder components configured to be used to build a plurality of components of a web application and further configured to be reusable within a server-hosted web application builder framework;
causing display on a client device of a user interface for the web application builder framework, the user interface comprising:
a selectable list of a subset of the web application builder components, and
one or more development areas for building a web application builder based on user input;
processing a first user request to select one or more of the subset of web application builder components from the selectable list to be implemented in the one or more development areas;
implementing, in response to the first user request, the selected one or more web application builder components in the one or more development areas;
configuring, in response to first user input, a first one or more attributes of one or more component behaviors of the selected one or more web application builder components;
retrieving a metadata model associated with the selected one or more web application builder components;
modifying the metadata model by at least adding to or editing one or more nodes of the metadata model, the one or more nodes associated with the first one or more attributes;
storing the modified metadata model in a database; and
causing display on one or more client devices of the web application builder for constructing web applications, the web application builder implementing at least the one or more web application builder components implemented in the one or more development areas.

9. The method of claim 8, further comprising:
processing a second user request to modify the one or more web application builder components within the one or more development areas; and
updating, in response to the second user request, the one or more web application builder components within the one or more development areas.

10. The method of claim 9, wherein the second user request to modify the one or more web application builder components comprises at least one of: adding, removing, or modifying one or more attributes of the one or more web application builder components.

11. The method of claim 8, wherein the first user request comprises a drag-and-drop movement of the selected one or more web application builder components onto at least a portion of the one or more development areas.

12. The method of claim 8, wherein the selectable list of web application builder components comprises one or more graphical representations of the web application builder components.

13. The method of claim 8, wherein implementing the selected one or more web application builder components in the one or more development areas comprises presenting a graphical representation of the one or more web application builder components according to an object type.

14. The method of claim 1, wherein the web application builder and the web application builder framework are browser applications configured to be executable on one or more browsers operating on one or more client devices.

15. A computer program product comprising computer-readable program code capable of being executed by one or more processors when retrieved from a non-transitory computer-readable medium, the program code comprising instructions configurable to cause:

providing, for interaction with a database, an identification of a plurality of web application builder components configured to be used to build a plurality of components of a web application and further configured to be reusable within a server-hosted web application builder framework;

displaying on a client device a user interface for the web application builder framework, the user interface comprising:
  a selectable list of a subset of the web application builder components, and
  one or more development areas for building a web application builder based on user input;

processing a first user request to select one or more of the subset of web application builder components from the selectable list to be implemented in the one or more development areas;

implementing, in response to the first user request, the selected one or more web application builder components in the one or more development areas;

configuring, in response to first user input, a first one or more attributes of one or more component behaviors of the selected one or more web application builder components;

retrieving a metadata model associated with the selected one or more web application builder components;

modifying the metadata model by at least adding to or editing one or more nodes of the metadata model, the one or more nodes associated with the first one or more attributes;

storing the modified metadata model in a database; and displaying on one or more client devices the web application builder for constructing web applications, the web application builder implementing at least the one or more web application builder components implemented in the one or more development areas.

16. The computer program product of claim 15, the program code comprising instructions further configurable to cause:

processing a second user request to modify the one or more web application builder components within the one or more development areas; and updating, in response to the second user request, the one or more web application builder components within the one or more development areas.

17. The computer program product of claim 16, wherein the second user request to modify the one or more web application builder components comprises at least one of:

adding, removing, or modifying one or more attributes of the one or more web application builder components.

18. The computer program product of claim 15, wherein the first user request comprises a drag-and-drop movement of the selected one or more web application builder components onto at least a portion of the one or more development areas.

19. The computer program product of claim 15, wherein the selectable list of web application builder components comprises one or more graphical representations of the web application builder components.

20. The computer program product of claim 15, wherein implementing the selected one or more web application builder components in the one or more development areas comprises presenting a graphical representation of the one or more web application builder components according to an object type.

* * * * *